United States Patent [19]

Lammers

[11] Patent Number: 6,130,655
[45] Date of Patent: *Oct. 10, 2000

[54] PLASMA-ADDRESSED DISPLAY

[75] Inventor: Matheus J. G. Lammers, Eindhoven, Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/812,223

[22] Filed: Mar. 6, 1997

[30]  Foreign Application Priority Data

Mar. 18, 1996 [EP] European Pat. Off. ............. 96200749

[51] Int. Cl.[7] .............................. G09G 3/28; H01J 9/26; H01J 17/49
[52] U.S. Cl. ............................ 345/72; 345/60; 445/25; 313/586
[58] Field of Search .................................. 345/72, 87, 60

[56] References Cited

U.S. PATENT DOCUMENTS

| | | |
|---|---|---|
| 5,267,045 | 11/1993 | Stroomer . |
| 5,396,149 | 3/1995 | Kwon ................................. 345/72 |
| 5,546,101 | 8/1996 | Sugawara .......................... 345/72 |
| 5,608,419 | 3/1997 | Lee et al. ........................... 313/586 |
| 5,689,153 | 11/1997 | Tanamachi ........................ 345/60 |
| 5,759,079 | 6/1998 | Tanamachi ........................ 445/25 |
| 5,835,167 | 11/1998 | Bonagaerts et al. ................ 345/74 |

FOREIGN PATENT DOCUMENTS

0325387B1  7/1989  European Pat. Off. .

OTHER PUBLICATIONS

"A 16 Inch Full Colour Plasma–addressed Active–Matrix LCD", Digest of Technical Papers, 1993 SID International Symposium, Soc. For Info. Display pp. 883–886 by Buzak et al.

*Primary Examiner*—Mark R. Powell
*Assistant Examiner*—Anthony J. Blackman
*Attorney, Agent, or Firm*—Robert J. Kraus

[57] ABSTRACT

A plasma-addressed electro-optical display device comprising a layer of electro-optical material (42), data electrodes (18) coupled to the electro-optical layer (42) to receive data voltages for activating portions of the electro-optical layer (42), and a plurality of plasma channels (20) extending generally transverse to the data electrodes (18) for selectively switching on these electro-optical portions. The plasma channels (20) each comprise spaced elongated cathode (30) and anode (31) electrodes and an ionizable gas filling (44). The cathode (30) and anode (31) electrodes are arranged in groups to reduce the number of drivers (28) required to drive the cathode (30) and anode (31) electrodes. To further reduce the total number of drivers of a PALC display device which has more pixels per row than rows, the plasma channels (20) are interchanged with the data electrodes (18). The plasma channels (20) now extending in the column direction and the data electrodes (18) extending in the row direction. The video signal (V) to be displayed has to be converted into data signals supplied to the data electrodes (18) in a column wise way instead of in a row wise way.

15 Claims, 4 Drawing Sheets

PLASMA-ADDRESSED DISPLAY

BACKGROUND OF THE INVENTION

This invention relates to a plasma-addressed display device for displaying a matrix of M rows of N pixels wherein N is larger than M, the display device comprising: a layer of electro-optical material sandwiched between elongated data electrodes and plasma channels, the data electrodes and the plasma channels crossing each other for obtaining overlapping areas constituting pixelelements corresponding to the pixels, each plasma channel comprising spaced first and second electrodes, a plasma driver circuit coupled to the first and the second electrodes for selectively activating the plasma channels for selecting pixelelements associated with the activated plasma channel, the first electrodes being interconnected in a number of first groups and the second electrodes being interconnected in a number of second groups such that each of the first groups includes no more than one electrode of each of the second groups, and a data driver circuit coupled to the data electrodes for supplying data signals to the pixelelements in response to a video information.

EP-B-0,325,387 discloses a plasma-addressed liquid crystal display, commonly referred to as a "PALC" display device. The known PALC display device comprises: a first substrate on which parallel transparent column electrodes are deposited, a second substrate which has parallel sealed plasma channels corresponding to rows of the display, and an electro-optical material such as a liquid crystal material sandwiched between the substrates. Each of the plasma channels of the second substrate is filled with a low pressure ionizable gas, such as helium, and contains spaced cathode and anode electrodes along the channel for ionizing the gas to create a conductive plasma. The channels are closed off by a thin transparent dielectric sheet. Each of the plasma channels crosses all of the column electrodes to form a matrix of overlapping regions. The overlapping regions correspond to pixels of the electro-optical material.

The operation of the PALC display device is, by way of example, further elucidated in case the electro-optical material is liquid crystal material (LC-material). The plasma channel acts as a row switch capable of selectively addressing a row of liquid crystal pixel elements (LC-pixels). Successive lines of data signals representing an image to be displayed are sampled at column positions and the sampled data voltages are respectively applied to the column electrodes. All but one of the row plasma channels are in the de-ionized or non-conducting state. The plasma of the one ionized selected plasma channel is conducting and, in effect, establishes a reference potential on the adjacent side of a row of LC-pixels, causing each LC-pixel to charge to the difference of the reference potential and the column potential. Then, the ionized channel is turned off for isolating the LC-pixel charge and storing the data voltage for a frame period. When the next row of data appears on the column electrodes, only the succeeding plasma channel row is ionized to store the data voltages in the succeeding row of LC-pixels, and so on. As is well known, the attenuation of each LC-pixel to backlight or incident light is a function of the stored voltage across the pixel.

Further, two possibilities are disclosed to select the plasma channels one by one. The first possibility shows that one electrode of each plasma channel is connected to a reference potential. So, all these electrodes can be interconnected to receive the reference potential. The remaining electrode of each plasma channel is connected to receive a pulse signal. The plasma channels are selected one by one by supplying one pulse signal with a voltage pulse which has a value with respect to the reference voltage that is large enough to ionize the plasma, while all other pulse signals supply a voltage which has a value with respect to the reference voltage that is too low to ionize the plasma. Assuming a PALC display device with N rows of pixels, N pulse drivers are needed to supply the N pulse signals to the panel. Such a panel has 2N connections for supplying the pulse signals and the reference voltage to the electrodes of the plasma channels. The second possibility shows that the number of pulse drivers decreases by taking together in groups both the anode and the cathode electrodes. The groups are chosen such that each of the anode groups includes no more than one electrode of each of the cathode groups, and in the same way, each of the cathode groups includes no more than one electrode of each of the anode groups. Each anode group is electrically isolated from the other anode groups, and each cathode group is electrically isolated from the other cathode groups. The adjacent cathode-anode electrode pairs are each located in one channel, and the channels whose electrodes form any one of a first group thus include no more than one electrode of any one of the second group. Each channel thus corresponds to a respective unique combination of one cathode group and one anode group. Assuming again a PALC display device with N rows of pixels, both the cathode and anode electrodes are taken together in groups of $N^{1/2}$ lines, with one pulse driver per group. This leads to $2N^{1/2}$ instead of N pulse drivers, and if the connections in each of the groups is made on the PALC display panel to $2N^{1/2}$ instead of 2N connections.

The known display device has as a drawback that still a lot of data drivers are needed to supply the data signals to the column electrodes.

OBJECTS AND SUMMARY OF THE INVENTION

It is an object of the invention to provide a display device of which a total number of drivers is decreased.

An aspect of the invention is characterized in that the data electrodes are arranged to constitute the M rows, the plasma channels are arranged to constitute N columns, and the data driver circuit is adapted to supply data signals to a column of selected pixelelements. The invention is based on the insight that, in practice, PALC displays contain more pixels per row than rows. The total number of connections can be lowered by transposing the display such that the plasma channels constitute the columns, and the former column electrodes now constitute the rows. The former column electrodes further will be referred to as data electrodes to avoid confusion about "column" electrodes extending in the row direction. Now a conductive plasma channel selects a column instead of a row of pixel elements. This necessitates that the video signal is supplied to a column of selected pixels instead to a row of selected pixels. If the video signal comprises frames of lines, as is usually the case, a video transposing circuit is needed to transpose the video information. If the video signal is generated by a computer video card which uses memory to store the video information, the circuitry controlling the memory has to be adapted to transpose the video information.

The following example elucidates that the measure of the invention decreases the total number of drivers needed to supply drive signals to the PALC display panel. Suppose a known PALC display with an aspect ratio of 3:4 would have 1200 rows (plasma channels) and 1600 columns (data electrodes). The total number of drivers is not less than about 1670, viz. $2*1200^{1/2}$ for driving the anode and cathode groups and 1600 for driving the data electrodes. A corresponding PALC display according to the invention has 1200 data rows and 1600 plasma channels. The total number of drivers is only 1280, viz. $2*1600^{1/2}$ for driving the anode and cathode groups and 1200 for driving the data electrodes. The invention may offer even a more substantial decrease in the total number of drivers for the new displays with an aspect ratio of 16:9 in which the number of pixels in a row is likely to be even much more larger than the number of rows.

The decreased number of data electrodes has the further advantage that the spacing between the connections to the data electrodes becomes larger.

As for the ignition of the plasma it is only important to supply a large enough voltage difference between the anode and cathode electrodes it is possible to interchange the position of the anode and cathode electrodes. Therefor these electrodes are also referred to as first and second electrodes.

A video transposing circuit and a transposed liquid crystal display are known from U.S. Pat. No. 5,267,045. This known art discloses a video circuit adapted to enable the display of video information of various television standards which have a different number of lines per frame on a liquid crystal display, further referred to as LCD, which has a fixed number of rows. The video circuit comprises a memory, and reads in the video information in the row direction, and subsequently reads out the video information in the column direction with an adaptable clock rate. In an embodiment the readout video information is presented to the rows of a transposed LCD. There is no suggestion that this transposed LCD has any advantage when standards having mutually differing line numbers are not an issue.

Advantageous embodiments are described in the dependent claims.

In an embodiment as characterized in claim 3 a further reduction of the total number of connections is reached.

The publication "A 16 Inch Full Colour Plasma-addressed Active-Matrix LCD", Digest of Technical Papers, 1993 SID International Symposium, Soc. for Info. Display pp. 883–886 by Buzak et al., discloses a colour PALC display device. Each intersection of one plasma channel extending in the row direction with three data electrodes (to which colour filters are aligned, one colour filter for each colour red, green, and blue) extending in the column direction defines a full colour pixel. So, with respect to the example given above, such a PALC display device has 1200 rows (plasma channels) and 3*1600 columns (data electrodes). The total number of connections is not less than about 4870, viz. $2*1200^{1/2}$ for the anode and cathode groups and 4800 for the data electrodes.

The embodiment according to claim 3 constitutes a group of pixels by using three plasma channels in column direction crossed by one data electrode in row direction. Now, the colour filters are aligned with the plasma channels. A plasma driver circuit connected to the groups of anode and cathode electrodes has to be adapted to sequentially scan the three plasma channels in a group. A data driver circuit connected to the data electrodes has to be adapted to supply the data signals belonging to the three colours sequentially to the common data electrode such that the data of a specific colour is presented to the activated plasma channel associated to a colour filter corresponding to that colour. In this way the number of data electrodes and thus the number of connec-tions thereto reduces by a factor three. The number of plasma channels increases with a factor three, but as the anodes and cathodes are grouped together the number of pulse drivers connected to the grouped anode and cathode electrodes only increases with the square root. Thus the total number of drivers decreases. Referring to the above given example, the PALC display according to the invention comprises 1200 data electrodes extending in the row direction and 3*1600 plasma channels extending in the column direction. The total number of drivers is only about 1339, viz. $2*(3*1600)^{1/2}$ for the anode and cathode groups and 1200 for the data electrodes, which is significantly lower than the 4870 drivers needed in the known PALC display. If the interconnections between cathode and anode electrodes, respectively are made on the PALC panel, also the number of connections decreases with the same amount.

Although the aboved described way of grouping the anode and cathode electrodes is very efficient a lot of other possibilities exist to group the anode and cathode electrodes whereby the demands formulated above are satisfied. Then still the number of pulse drivers decreases, but to a lesser extent. It may be advantageous to group less than the maximal allowable $N^{1/2}$ electrodes to lower the capacitive load of the pulse driver connected to such a group of electrodes.

These and other aspects of the invention will be described and elucidated with reference to the accompanying drawings.

DESCRIPTION OF THE PREFERRED EMBODIMENTS

Figure 1:
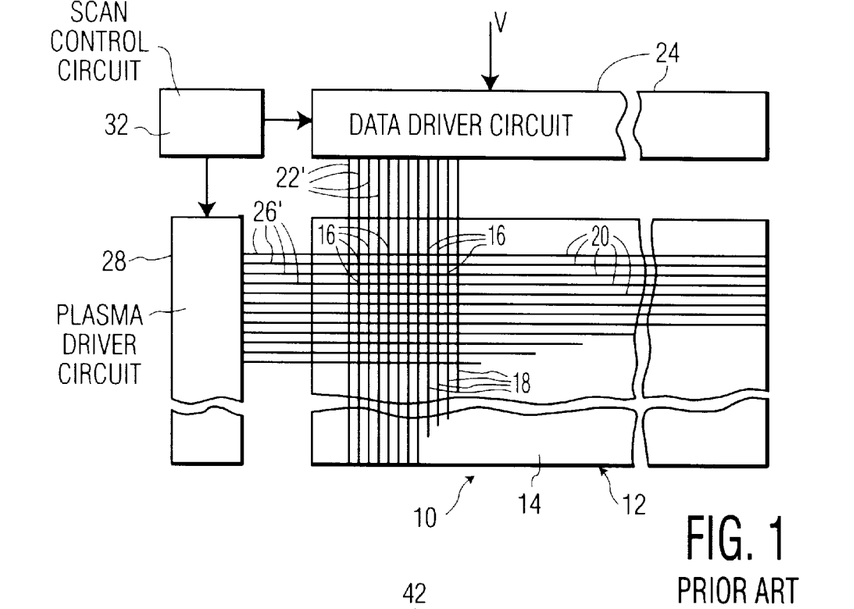
FIG. 1 is a schematic block diagram of a conventional flat panel display system.
Figure 2:
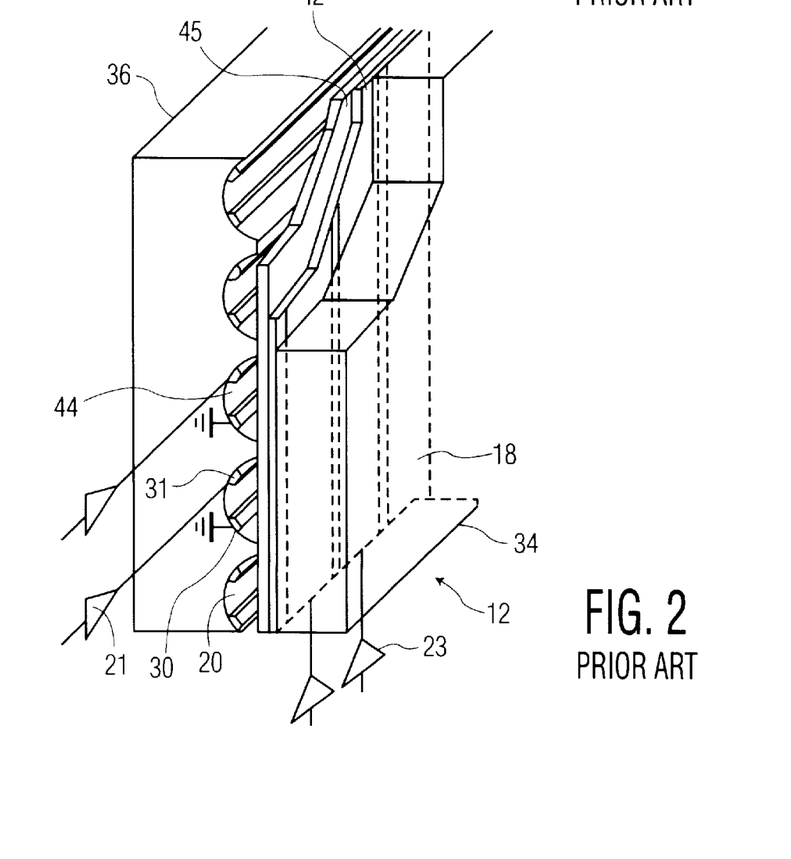
FIG. 2 is a perspective view of part of a conventional PALC display device.

FIG. 1 and FIG. 2 are used in combination to explain the construction and the electronic circuitry to drive a conventional PALC display. FIG. 1 shows a flat panel display system 10, which represents a typical PALC display device. The flat panel display system comprises a display panel 12 having a display surface 14 which contains a pattern formed by a rectangular planar array of nominally identical data storage or display elements 16 (also referred to as pixels) mutually spaced apart by predetermined distances in the vertical and horizontal directions. Each display element 16 in the array represents the overlapping portions of thin, narrow electrodes 18 arranged in vertical columns and elongate, narrow plasma channels 20 arranged in horizontal rows. (The electrodes 18 are hereinafter also referred to as "column electrodes"). The display elements 16 associated with one of the channels 20 represent one line of data of a video information V.

The widths of column electrodes 18 and channels 20 determine the dimensions of display elements 16, which are typically of rectangular shape. Column electrodes 18 are deposited on a major surface of a first electrically nonconductive, optically transparent substrate 34 (see FIG. 2), and the plasma channel rows are usually built into a second transparent substrate 36. An electro-optical material 42 such as a liquid crystal (LC) material is located between the substrates 34 and 36. Skilled persons will appreciate that certain systems, such as reflective displays of either the direct view or projection type, would require that only one substrate is optically transparent.

The column electrodes 18 receive data drive signals developed on parallel output conductors 22' by output amplifiers 23 (FIG. 2) of a data driver circuit 24 which receives the video information V. The channels 20 receive data strobe signals of the voltage pulse type developed on parallel output conductors 26' by output amplifiers 21 (FIG. 2) of a plasma driver circuit 28. A cathode electrode 30 (FIG. 2) and an anode electrode 31 are provided in each of the channels 20.

To synthesize an image on the entire area of display surface 14, display system 10 employs a scan control circuit 32 that coordinates the functions of the data driver circuit 24 and the plasma driver circuit 28 so that all columns of display elements 16 of display panel 12 are addressed row by row. Display panel 12 may employ electro-optical materials 42 of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optical material would not require the use of polarizing filters, however. All such materials or layers of materials which attenuate transmitted or reflected light in response to the voltage across it are referred to herein as electro-optical materials. Liquid crystal (LC) materials are presently the most common example, the detailed description will refer to LC materials but it will be understood that the invention is not limited to display panels with liquid crystal materials.

FIG. 2 illustrates a PALC display panel using LC material. Only a few column electrodes 18 and plasma channels 20 are shown. The rows of the PALC display panel are constituted by a plurality of parallel elongated sealed plasma channels 20 underlying a layer 42 of the LC material. Each of the plasma channels 20 is filled with an ionizable gas 44, is closed off with a thin dielectric sheet 45 typically of glass, and contains on an interior channel surface first and second spaced elongated electrodes 30, 31 which extend the full length of the plasma channel 20. The first electrode 30 in the prior art arrangement is typically grounded and is commonly called the cathode. The second electrode 31 is called the anode, because a positive strobe pulse sufficient to cause electrons to be emitted from the cathode electrode 30 to ionize the gas will typically be supplied to the anode 31 relative to the cathode electrode 30. As explained above, each plasma channel 20, in turn, has its gas ionized with a strobe pulse to create a plasma. The ionized plasma has a low conductivity and connects a reference potential to a row of pixels in the LC layer 42 above. When the strobe pulse terminates, and after deionization has occurred, the next channel is strobed and turned on. Since the column electrodes 18 each cross a whole column of pixels, only one plasma channel 20 at a time is allowed to be active (in the conductive state) to avoid crosstalk.

Figure 3:
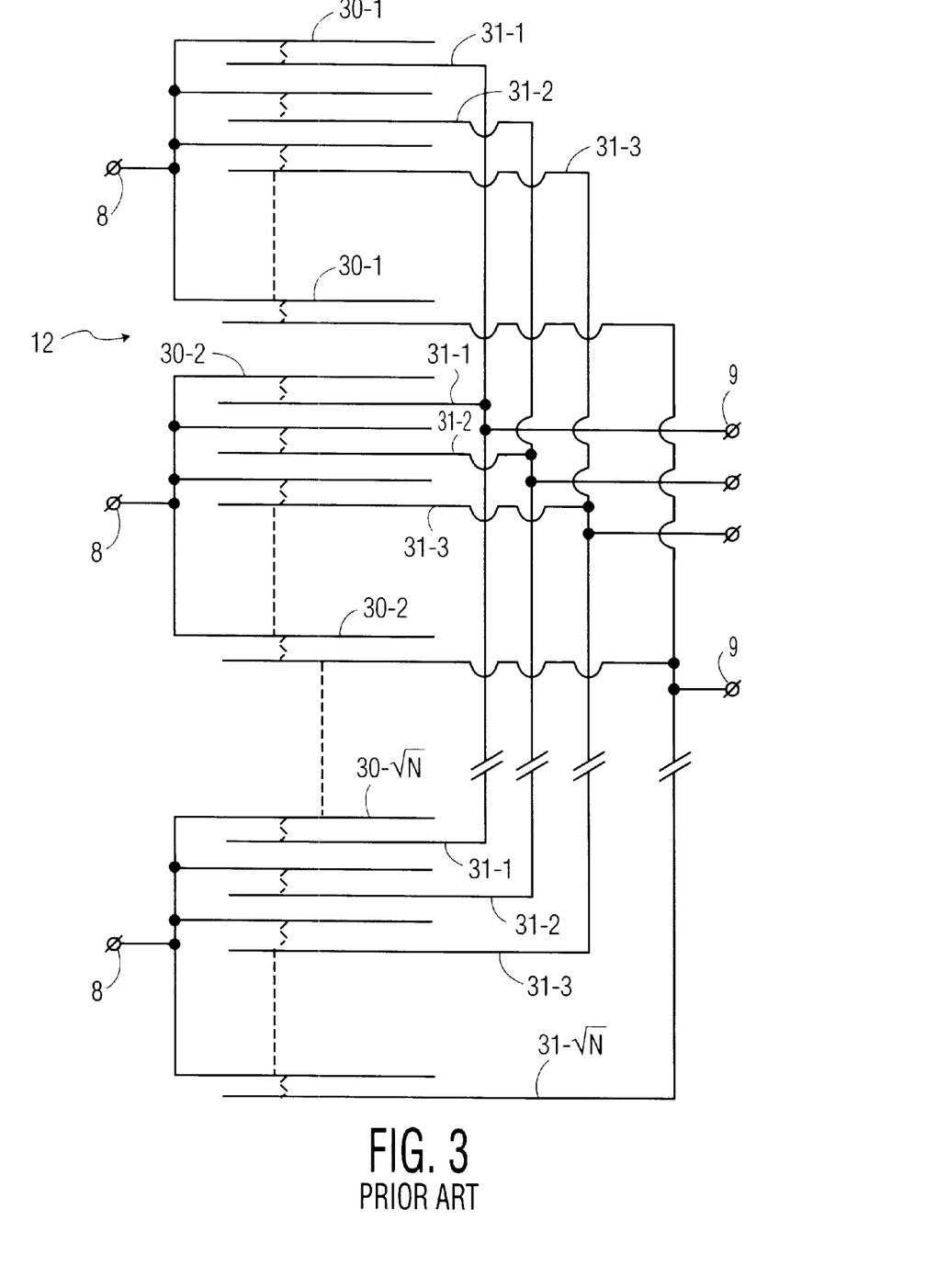
FIG. 3 is a circuit schematic of a known arrangement of channel cathode and anode electrode connections into plural groups.

FIG. 3 is a circuit schematic of a known arrangement of channel cathode 30-1, ..., 30-√N and anode 31-1, ..., 31-√N electrode connections into plural groups which are electrically isolated from each other. The number of pulse drivers coupled to the connections 8,9 to a PALC display panel 12 decreases by taking together in groups both the cathode electrodes 30-1, ..., 30-√N and the anode electrodes 31-1, ..., 31-√N, such that each of the cathode groups 30-1, ..., 30-√N includes no more than one electrode of each of the anode 31-1, ..., 31-√N groups, and in the same way, each of the anode groups 31-1, ..., 31-√N includes no more than one electrode of each of the cathode groups 30-1, ..., 30-√N. Adjacent cathode-anode electrode pairs are located in one plasma channel 20, and the plasma channels 20 whose electrodes form any one of a first group thus include no more than one electrode of any one of the second group. The anode and cathode electrodes may be interconnected on the PALC display panel (as shown) to also reduce the number of connections of the PALC display panel. Assuming such a PALC display device with N rows of pixels, both the cathode electrodes 30-1, ..., 30-√N and anode electrodes 31-1, ..., 31-√N are taken together in groups of $N^{1/2}$ lines, with one connection 8,9 per group. This leads to $2N^{1/2}$ connections 8,9 instead of N+1 connections (N for the pulse drivers connected to the anode electrodes, and 1 for the reference voltage connected to the cathode electrodes which are interconnected on the PALC display panel) to the output conductors 26'.

By this way of grouping anode and cathode electrodes the lowest possible number of pulse drivers and/or connections is obtained. A lot of other possibilities exist to group the anode and cathode electrodes whereby the demands formulated above are satisfied. Then still the number of pulse drivers decreases, but to a lesser extent.

Figure 4:
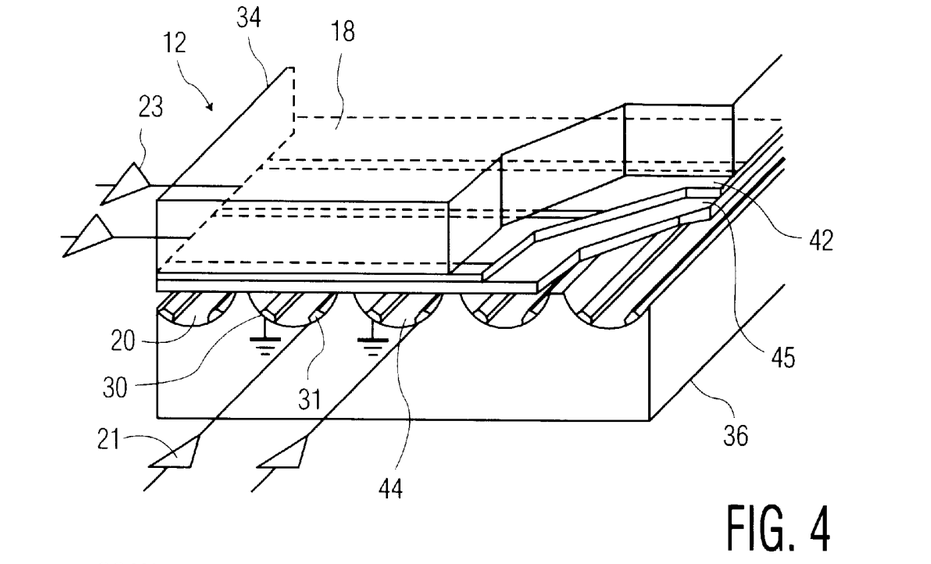
FIG. 4 is a perspective view of part of a PALC display device according to the invention.

FIG. 4 is a perspective view of part of a PALC display device according to the invention. The same reference numerals are referring to the same elements as in FIG. 2. The PALC display panel 12 is transposed such that the plasma channels 20 constitute the columns, and the former column electrodes 18 now constitute the rows. The electrodes 18 further will be referred to as data electrodes 18 to avoid confusion that "column" electrodes extend in the row direction. The cathode electrodes 30 and anode electrodes 31 are grouped together to minimize the number of pulse drivers 28 needed to activate the plasma channels 20.

Figure 5:
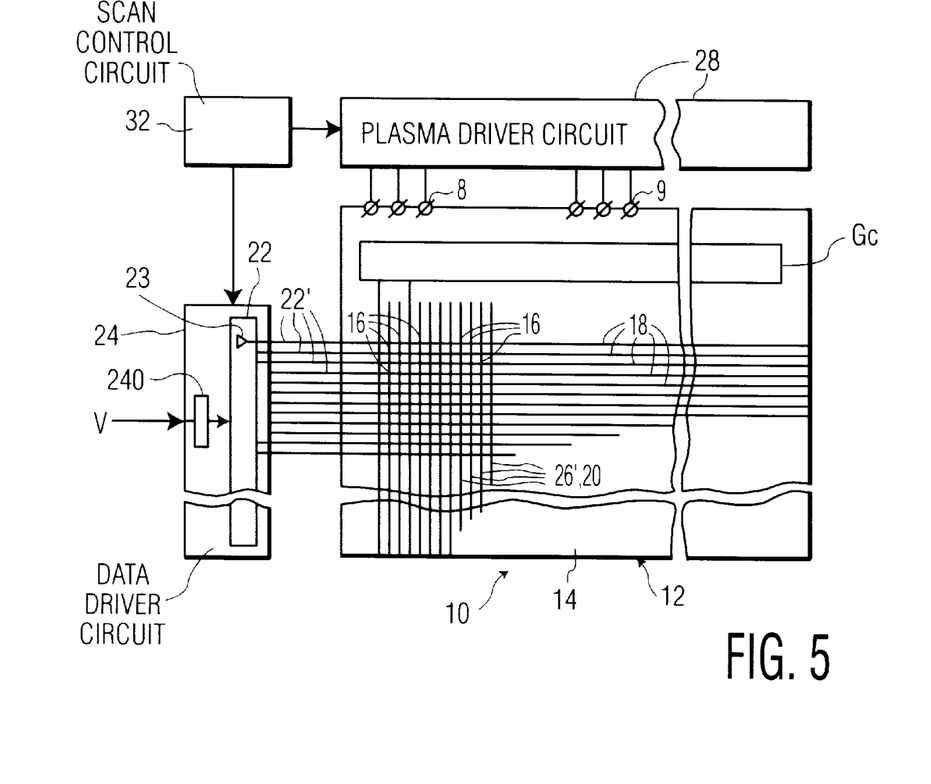
FIG. 5 is a schematic block diagram of a flat panel display system according to the invention.

FIG. 5 is a schematic block diagram of a flat panel display system according to the invention. The same reference numerals are referring to the same elements as in FIG. 1. The plasma drive circuit 28 supplies the data strobe signals via the connections 8,9 to the grouped output conductors 26' which are connected to the cathode and anode electrodes 30,31 of each plasma channel 20. For the sake of simplicity the grouping of the cathode and anode electrodes 30,31, of which an example is shown in FIG. 3, is depicted by a block with reference Gc. The data driver circuit 24 receives the video information V and supplies the data drive signals via the parallel output conductors 22' and the output amplifiers 23 to the data electrodes 18. As now the plasma channels 20 select columns instead of rows of pixel elements 16, the video information V has to be converted to data signals which are supplied to the data electrodes 18 column-wise instead of row-wise. This necessitates a video transposing circuit 240.

Figure 6:
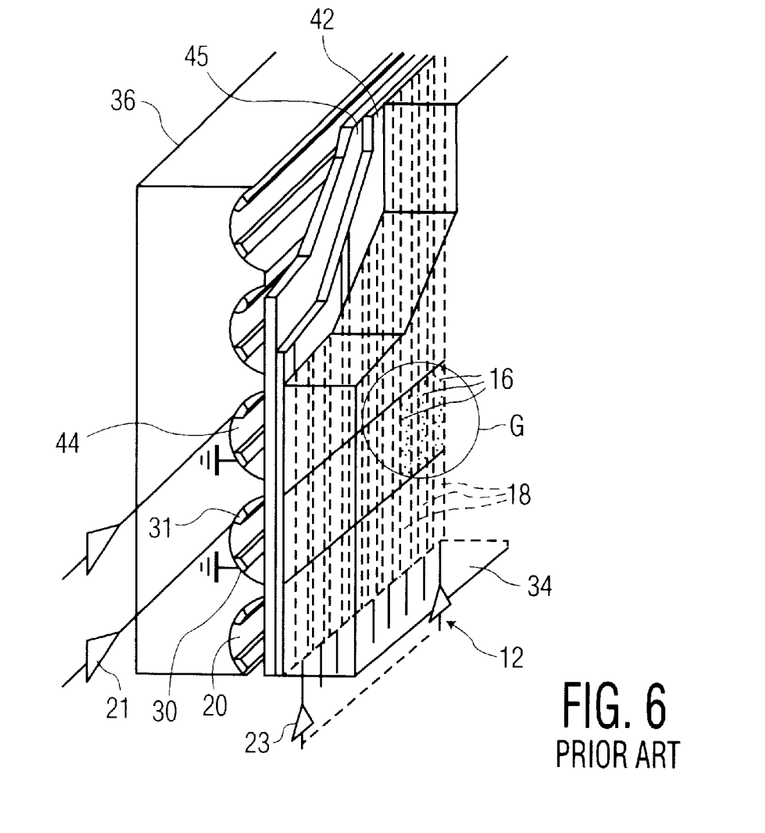
FIG. 6 is a perspective view of part of a conventional colour PALC display device.

FIG. 6 is a perspective view of part of a conventional colour PALC display device as shown in the cited publication of Buzak et al. Three colour filters which transmit each a different primary colour are associated with three adjacent column electrodes 18 to obtain groups G of three display elements or pixels 16. Thus, each group of pixels is constituted by three column electrodes 18 extending in the column direction and one plasma channel 20 extending in the row direction.

For a projection display, colour can also be achieved by using three separate monochrome panels 12, each of which controls one primary colour. In this case the width of the column electrodes 18 could be larger than shown in FIG. 6 to obtain predominantly square pixels 16, as shown in FIG. 4.

Figure 7:
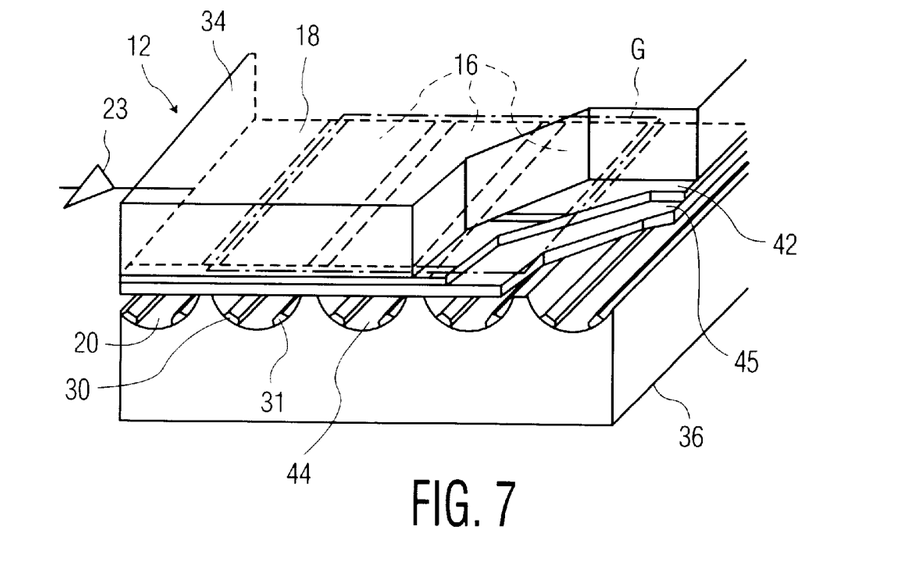
FIG. 7 is a perspective view of part of colour PALC display device according to the invention.

FIG. 7 is a perspective view of part of another PALC display device according to the invention. The same reference numerals are referring to the same elements as in FIG. 4. The transposed PALC colour display device of FIG. 4 is adapted such that a group G of pixels 16 is constituted by three adjacent plasma channels 20 extending in the column direction and one associated data electrode 18 extending in the row direction. The number of data electrodes 18 and thus the number of connections thereto decreases with a factor three. The number of plasma channels 20 increases by a factor three, but the number of connections 8,9 to the plasma channels only increases with the square root. So, the total number of connections to the PALC display device further decreases.

As a short recapitulation another example is discussed assuming a PALC display device with 576 lines of 720 pixels each. In a known not transposed PALC display device according to FIG. 2, $2*\sqrt{576}=48$ output amplifiers 21 are needed to drive the cathode 30 and anode 31 electrodes of the plasma channels 20 extending in the row direction, and 720 output amplifiers 23 to drive the column electrodes 18, so in total 768 connections or drivers are needed. In a transposed PALC display device according to FIG. 4, $2*\sqrt{720}\approx54$ output amplifiers 21 are needed to drive the cathode 30 and anode 31 electrodes of the plasma channels 20 extending in the column direction, and 576 output amplifiers 23 to drive the data electrodes 18 extending in the row direction, so in total 630 (instead of 768) connections or drivers are needed. In a known PALC colour display device according to FIG. 6, $2*\sqrt{576}=48$ output amplifiers 21 are needed to drive the cathode 30 and anode 31 electrodes of the plasma channels 20 extending in the row direction, and $3*720=2160$ output amplifiers 23 to drive the data electrodes 18 extending in the column direction, so in total 2208 connections or drivers are needed. In a transposed PALC colour display device according to FIG. 7, $2*\sqrt{(3*720)}\approx93$ output amplifiers 21 are needed to drive the cathode 30 and anode 31 electrodes of the plasma channels 20 extending in the column direction, and only 576 output amplifiers 23 to drive the data electrodes 18 extending in the row direction, so in total 669 (instead of 2208) connections or drivers are needed.

The invention can be used in all kinds of PALC displays, such displays typically have a small channel pitch for use in computer monitors, workstations or TV applications.

While the invention has been described in connection with preferred embodiments, it will be understood that modifications thereof within the principles outlined above will be evident to those skilled in the art and thus the invention is not limited to the preferred embodiments but is intended to encompass such modifications.

Phrased in other words, a primary aspect of the invention relates to a plasma-addressed electro-optical display device comprising a layer of electro-optical material 42, data electrodes 18 coupled to the electro-optical layer 42 and adapted to receive data voltages for activating portions of the electro-optical layer 42, and a plurality of plasma channels 20 extending generally transverse to the data electrodes 18 for selectively switching on said electro-optical portions. The plasma channels 20 each comprise spaced elongated cathode and anode electrodes 30,31 and an ionizable gas filling 44. The cathode and anode electrodes 30,31 are arranged in groups to reduce the number of drivers 28 required to drive the cathode and anode electrodes 30,31. To further reduce the total number of drivers of a PALC display device which has more pixels per row than rows, plasma channels 20 are interchanged with the data electrodes 18. The plasma channels 20 now extending in the column direction and the data electrodes 18 extending in the row direction. The video signal V to be displayed has to be converted into data signals supplied to the date electrodes 18 in a column-wise way instead of in a row-wise way.

Any reference signs in the following claims cannot be construed as limiting the claims.

What is claimed is:

1. A plasma-addressed display device for displaying a matrix of M×N pixels arranged as an array of lines of pixels (16), the display device comprising:

a layer of electro-optical material (42) sandwiched between a plurality M of elongated electrodes (18) extending in a first direction, and a plurality N of plasma channels (20) extending in a second direction, the elongated electrodes (18) and the plasma channels (20) crossing each other and defining overlapping areas which constitute pixelelements corresponding to the pixels (16), each plasma channel (20) comprising a respective spaced first electrode (30) and second electrode (31), a plasma driver circuit (28) for selectively activating a plasma channel by applying a driving voltage between a connection for a selected group of interconnected first electrodes (30) and a connection for a selected group of interconnected second electrodes (31), and a data driver circuit (24) for supplying data signals to the pixelelements (16), respective pluralities of said first electrodes (30) being electrically interconnected to form a plurality of first groups (30-1, . . . 30-√N) of interconnected first electrodes, and each of said first groups being electrically isolated from the others of said first groups, respective pluralities of said second electrodes being interconnected to form a plurality of second groups (31-1, . . . 31-√N) of interconnected second electrodes, and each of said second groups being electrically isolated from the others of said second groups, said plurality of first groups and said plurality of second groups being arranged such that each respective plasma channel can be selectively activated by applying said driving voltage between a respective unique combination of one of said first groups and one of said second groups, characterized in that the data driver circuit (24) comprises M data drivers (23) only, and is adapted to supply data signals to a line of pixelelements (16) selected by the plasma driver circuit and extending in the second direction, and N is greater than M, whereby the number M of data drivers is less than the number N of pixels in the first direction.

2. A plasma-addressed display device as claimed in claim 1, characterized in that the display device further comprises color filters, each color filter being aligned with a respective plasma channel (20) for obtaining groups (G) of adjacent pixelelements (16) representing different colors enabling display of a color picture, the groups of pixelelements (G) each being constituted by a common data electrode (18) cooperating with a number of plasma channels (20) equal to the number of pixelelements (16) in the group (G) of adjacent pixelelements, the plasma driver circuit (28) being adapted for selectively activating the plasma channels (20) in the group of adjacent pixelelements, and the data driver circuit (24) being adapted to supply the data signals sequentially to the common data electrode (18).

3. A plasma-addressed display device as claimed in claim 2, characterized in that the data signals are responsive to a video information (V), and the video information (V) comprises a constant number of video lines.

4. A plasma-addressed display device as claimed in claim 1, characterized in that the plasma driving circuit comprises one respective first electrode driver only for each of said first groups of interconnected first electrodes, and one respective second electrode driver only for each of said second groups of interconnected first electrodes, whereby the plasma driving circuit comprises fewer than N first electrode drivers, and fewer than N second electrode drivers.

5. A plasma-addressed display device as claimed in claim 4, characterized in that the plasma channels are divided into $\sqrt{N}$ groups, whereby the number of first and second electrode drivers taken together equals $2\sqrt{N}$.

6. A plasma-addressed display device as claimed in claim 5, characterized in that the respective electrode drivers and respective data drivers include respective output amplifiers, the plasma driver circuit comprises $2\sqrt{N}$ output amplifiers only, and the data driver circuit comprises N output amplifiers only.

7. A plasma-addressed display device as claimed in claim 4, characterized in that the display device further comprises color filters, each color filter being aligned with a respective plasma channel (20) for obtaining groups (G) of adjacent pixelelements (16) representing different colors enabling display of a color picture, the groups of pixelelements (G) each being constituted by a common data electrode (18) cooperating with a number of plasma channels (20) equal to the number of pixelelements (16) in the group (G) of adjacent pixelelements, the plasma driver circuit (28) being adapted for selectively activating the plasma channels (20) in the group of adjacent pixelelements, and the data driver circuit (24) being adapted to supply the data signals sequentially to the common data electrode (18).

8. A plasma-addressed display device for displaying a matrix of M rows of pixels, each row comprising N respective pixels (16), and N being larger than M, the display device comprising:
- a layer of electro-optical material (42) sandwiched between elongated electrodes (18) and plasma channels (20), the elongated electrodes (18) and the plasma channels (20) crossing each other and defining overlapping areas which constitute pixelelements corresponding to the pixels (16), each plasma channel (20) comprising a respective spaced first electrode (31) and second electrode (30),
- a plasma driver circuit (28) for selectively activating a plasma channel by applying a driving voltage between a connection for a selected group of interconnected first electrodes (30) and a connection for a selected group of interconnected second electrodes (31), and
- a data driver circuit (24) for supplying data signals to the pixelelements (16) in response to a video information (V), respective pluralities of said first electrodes (30) being electrically interconnected to form a plurality of first groups (30-1, . . . 30-$\sqrt{N}$) of interconnected first electrodes, and each of said first groups being electrically isolated from the others of said first groups, respective pluralities of said second electrodes being interconnected to form a plurality of second groups (31-1, . . . 31-$\sqrt{N}$) of interconnected second electrodes, and each of said second groups being electrically isolated from the others of said second groups, said plurality of first groups and said plurality of second groups being arranged such that each respective plasma channel can be selectively activated by applying said driving voltage between a respective unique combination of one of said first groups and one of said second groups, characterized in that the device comprises M elongated electrodes (18) arranged to define the M rows, and N plasma channels (20) arranged to define the N columns, and the data driver circuit (24) comprises M data drivers (23) only, and is adapted to supply data signals to a column of selected pixelelements (16) selected by the plasma driver circuit, whereby the number M of data drivers is less than the number N of pixels in a row.

9. A plasma-addressed display device as claimed in claim 8, characterized in that the display device further comprises color filters, each color filter being aligned with a respective plasma channel (20) for obtaining groups (G) of adjacent pixelelements (16) representing different colors enabling display of a color picture, the groups of pixelelements (G) each being constituted by a common data electrode (18) cooperating with a number of plasma channels (20) equal to the number of pixelelements (16) in the group (G) of adjacent pixelelements, the plasma driver circuit (28) being adapted for selectively activating the plasma channels (20) in the group of adjacent pixelelements, and the data driver circuit (24) being adapted to supply the data signals sequentially to the common data electrode (18).

10. A plasma-addressed display device as claimed in claim 9, characterized in that the video information (V) comprises a constant number of video lines.

11. A plasma-addressed display device as claimed in claim 8, characterized in that the plasma driving circuit comprises one respective first pulse driver only for each of said first groups of interconnected first electrodes, and one respective second pulse driver only for each of said second groups of interconnected first electrodes, whereby the plasma driving circuit comprises fewer than N first pulse drivers, and fewer than N second pulse drivers.

12. A plasma-addressed display device as claimed in claim 11, characterized in that the video information (V) comprises a constant number of video lines.

13. A plasma-addressed display device as claimed in claim 11, characterized in that the plasma channels are divided into $\sqrt{N}$ groups.

14. A plasma-addressed display device as claimed in claim 13, characterized in that the respective pulse drivers and respective data drivers include respective output amplifiers, the plasma driver circuit comprises $2\sqrt{N}$ output amplifiers only, and the data driver circuit comprises M output amplifiers only.

15. A plasma-addressed display device as claimed in claim 14, characterized in that the display device further comprises color filters, each color filter being aligned with a plasma channel (20) for obtaining groups (G) of a number of adjacent pixelelements (16) representing different colors enabling display of a color picture, the groups of pixelelements (G) each being constituted by a common data electrode (18) cooperating with a number of plasma channels (20) equal to the number of pixelelements (16) in the group (G), the plasma driver circuit (28) being adapted for selectively activating the plasma channels (20) in the group, and the data driver circuit (24) being adapted to supply the data signals sequentially to the common data electrode (18).

* * * * *

UNITED STATES PATENT AND TRADEMARK OFFICE
CERTIFICATE OF CORRECTION

PATENT NO.     : 6,130,655
DATED          : October 10, 2000
INVENTOR(S)    : Matheus J.G. Lammers

It is certified that error appears in the above-identified patent and that said Letters Patent is hereby corrected as shown below:

<u>Column 9,</u>
Line 32, change "N" to -- M --.

Signed and Sealed this

Twelfth Day of November, 2002

Attest:

Attesting Officer

JAMES E. ROGAN
*Director of the United States Patent and Trademark Office*